United States Patent [19]
Waymon et al.

[11] Patent Number: 5,346,415
[45] Date of Patent: Sep. 13, 1994

[54] SUPPORT APPARATUS FOR USE IN A FISHING BOAT

[76] Inventors: Linda J. Waymon, 1927 Belleview Rd.; Jimmy D. McGuire, 296 Country Club Rd., both of Pocahontas, Ark. 72455

[21] Appl. No.: 123,674

[22] Filed: Sep. 20, 1993

[51] Int. Cl.⁵ .................................................. B60L 15/20
[52] U.S. Cl. ............................ 440/7; 297/344.21; 114/363; 248/637; 248/640; 211/86
[58] Field of Search ............... 114/144 R, 144 A, 153, 114/363; 440/7; 297/344.21; 248/637, 640; 211/86

[56] References Cited

U.S. PATENT DOCUMENTS

| 4,008,500 | 2/1977 | Hall, Jr. | 114/363 |
|---|---|---|---|
| 4,400,032 | 8/1983 | dePolo | 297/349 |
| 4,565,529 | 1/1986 | Aertker et al. | 440/7 |
| 4,597,356 | 7/1986 | McCaghren et al. | 114/363 |
| 4,702,713 | 10/1987 | Lee | 440/7 |
| 4,709,649 | 12/1987 | Wann | 114/363 |
| 4,722,706 | 2/1988 | Young | 440/7 |
| 4,979,458 | 12/1990 | Bouza | 114/363 |
| 5,052,325 | 10/1991 | Rhines | 114/363 |

FOREIGN PATENT DOCUMENTS 1240408  6/1986  U.S.S.R. .................. 297/344.21

Primary Examiner—Jesus D. Sotelo
Attorney, Agent, or Firm—Nixon & Vanderhye

[57] ABSTRACT

A simple to construct and utilize apparatus mounts a trolling motor control pedal and a seat in a fishing boat to provide optimum user comfort and control. A substantially planar plate has a control pedal mounted on its top surface near a first end of the plate, and has a sleeve for receiving the pedestal or post of a seat (chair) near the second end of the plate. Extending downwardly from the bottom surface of an intermediate portion of the plate is a shaft mounting the plate to the boat deck for rotation about a substnatially vertical axis of rotation. Beneath the pedestal-receiving sleeve is a rubberized non-skid material adhesively secured to the bottom surface of the plate to engage the boat deck and retard movement of the plate when a fisherman's weight is on the chair.

20 Claims, 4 Drawing Sheets

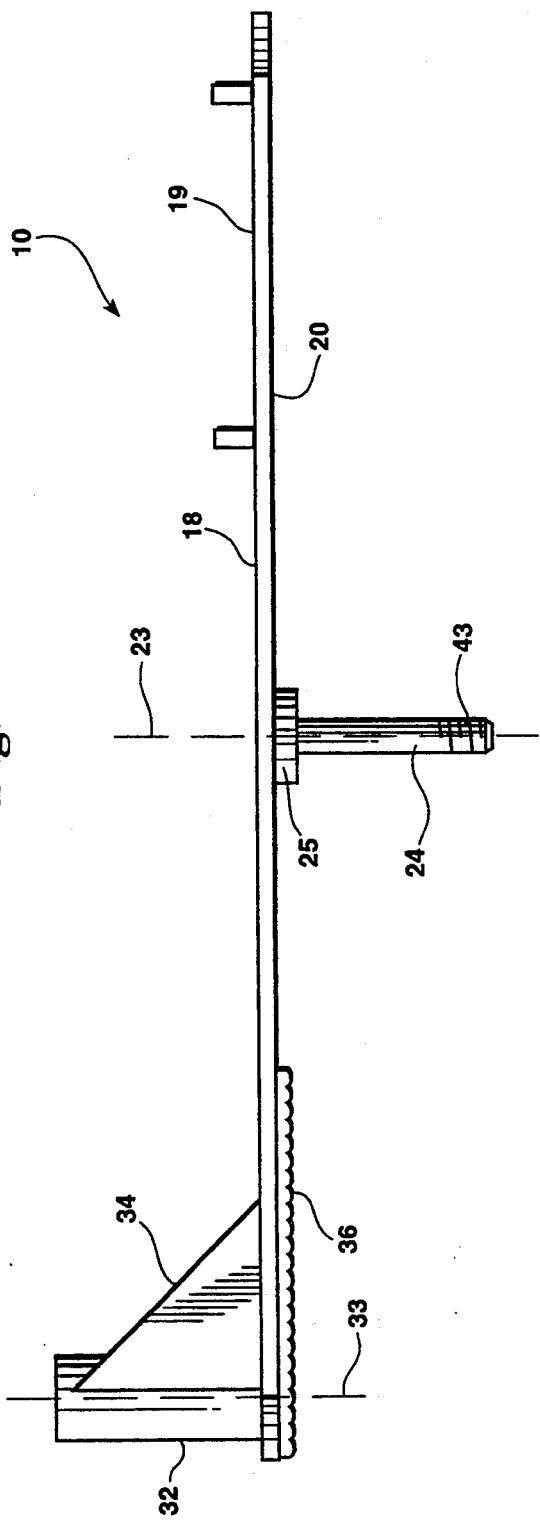
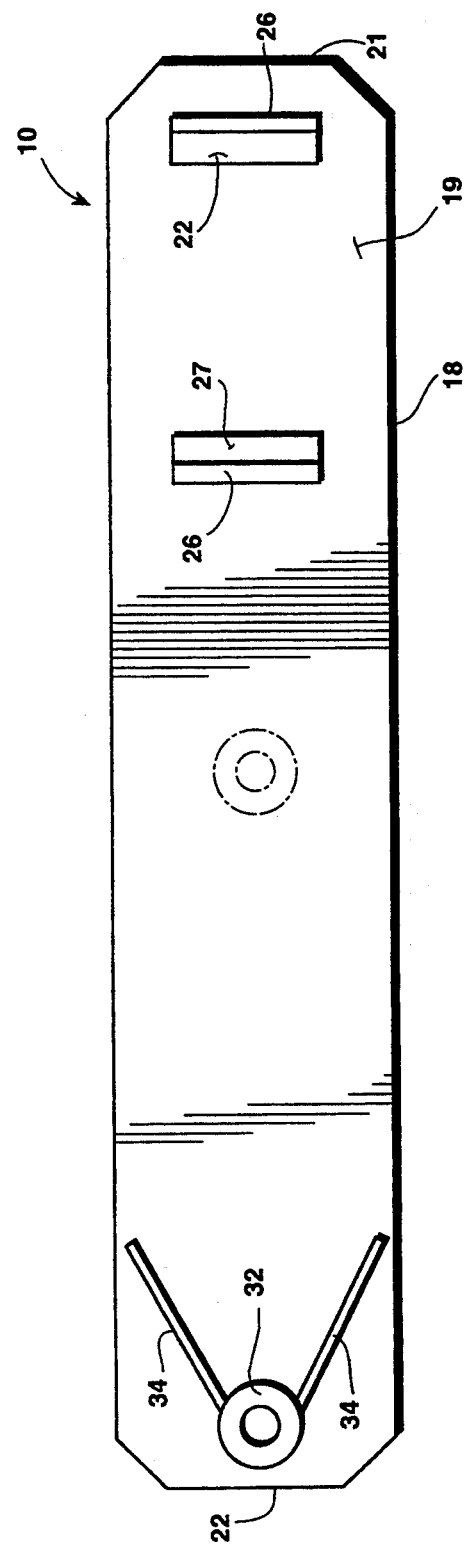

SUPPORT APPARATUS FOR USE IN A FISHING BOAT

BACKGROUND AND SUMMARY OF THE INVENTION

A variety of fishing boats have trolling motors which are controlled by a control pedal to allow a fisherman the free use of his or her hands. Such boats also desirably have a seat structure, such as a chair, for use by the fisherman both for safety and comfort. In the past there have been numerous proposals for supporting apparatus used to mount the trolling motor control pedal and chair for movement together, or independently of each other, in order to provide comfort, ease of control, and versatility of user movement, While such proposals have often been able to accomplish the desired end results, usually the strucures for accomplishing the desired results are complex and/or expensive. For example, U.S. Pat. No. 4,008,500 shows a proposal in which a control pedal for a trolling motor and a chair are mounted for movement together, both rotatable about a vertical axis with respect to a boat deck, and the chair also rotatable about a second vertical axis with respect to the control pedal. However the structure used to mount the chair and control pedal is large and expensive, and the structure is moved to various positions, and maintained in those positions, by a motorized gear box.

According to the present invention, apparatus is provided which provides for positive mounting of the position of a control pedal with respect to a fisherman's chair, allows both of them to be manually rotated about a vertical axis provided in the boat deck of a bass boat or the like, allows rotation of the chair with respect to the control pedal, and retards movement of the control pedal and chair support from a position to which it has been moved —just like in the sophisticated, complex and expensive prior art proposals—yet in a simple and inexpensive manner. This is primarily accomplished according to the invention by providing a support structure in the form of a simple substantially planar plate, having a non-skid material on the bottom surface thereof underneath a portion of the plate supporting a chair pedestal or post. The control pedal is also simply mounted in the plate at an end thereof opposite the chair pedestal mount, and a smiple downwardly extending shaft supports the plate for rotation about a first vertical axis with respect to the boat deck.

According to one aspect of the present invention, apparatus facilitating control of a trolling motor is provided comprising the following elements: A support struture having a top surface and a bottom surface, and first and second ends spaced from each other. Means for mounting the support structure for rotation about an axis, the mounting means extending outwardly from the bottom surface of the support structure between the first and second ends thereof. Means for mounting a trolling motor control pedal adjacent the first end of the support structure on the top surface of the support structure. Means for mounting a seat structure adjacent the second end of the support structure on the top surface of the support structure; and support structure movement-retarding means mounted on the bottom surface of the support structure adjacent the second end thereof, and below the seat structure mounting means to resist movement of the support structure to a position to which it has been moved if the movement-retarding means engages a boat deck surface beneath it. The support structure preferably comprises a substantially planar plate, the movement-retarding means a rubberized non-skid material adhesively secured to the bottom surface of the plate beneath the seat support, the seat suport comprises a sleeve for receiving a pedestal or post extending upwardly from the top surface of the plate, the rotation mounting means comprises a shaft and spacer washer mounted to and extending downwardly from the bottom of the plate, and the pedal-receiving means comprises surface manifestations (such as one or more apertures formed by upturning flanges from the surface of the plate) which engage a pedal.

According to another aspect of the present invention, a simple apparatus—which can be used in association with bass boats or the like—is provided which has the following elements: a substantially planar plate having a top surface and a bottom surface, a first end, and a second end. A sleeve connected to the plate top surface adjacent the second end thereof and extending upwardly from the top surface; and a shaft connected to the bottom surface of the plate roughly intermediate the first and second ends of the plate, and extending downardly from the bottom of the plate. The apparatus also preferably comprises a non-skid material connected to the plate bottom surface beneath the sleeve; and surface manifestations formed in the plate adjacent the first end thereof, and including at least one aperture in the plate or flange upstanding from the plate.

According to yet another aspect of the present invention, there is provided a fishing boat seat and trolling motor control pedal support structure assembly mounted in a fishing boat having a boat deck, trolling motor control pedal, and a trolling motor. The support structure assembly comprises: A support struture having a top surface and a bottom surface, and first and second ends spaced from each other. Means for mounting the support structure to the boat deck for rotation about a first substantially vertical axis, the mounting means extending outwardly from the bottom surface of the support structure between the first and second ends thereof into or through the boat deck. Means for mounting the trolling motor control pedal adjacent the first end of the support structure on the top surface of the support structure. A seat structure including a pedestal or post. Means for mounting the seat structure pedestal or post adjacent the second end of the support structure on the top surface of the support structure extending so that the seat structure is mounted above the boat deck, and so that the seat structure is rotatable about a second substantially vertical axis, spaced from the first axis, with respect to the support structure; and support structure movement-retarding means mounted on the bottom surface of the support structure adjacent the second end thereof, and below the seat structure mounting means to resist movement of the support structure to a position to which it has been moved if the movement-retarding means engages the boat deck beneath it. The support structure preferably comprises a substantially planar plate and the movement-retarding means preferably comprises rubberized non-skid material secured to the bottom surface of the support plate just above the boat deck, so that the weight of a human sitting on the seat structure causes the material to come in contact with the boat deck.

It is the primary object of the pesent invention to provide a simple yet versatile and effective mechanism providing fisherman comfort, safety, and optimum control in fishing using fishing boats with trolling motors. This and other objects of the invention will become clear from an inspection of the detailed description of the invention, and from the appended claims.

BRIEF DESCRIPTION OF THE DRAWINGS

FIG. 2 is a side view of an exemplary apparatus according to the present invention, with the foot pedal and chair with which it is designed to be used not illustrated;

FIGS. 3 and 4 are top and bottom plan views, respectively, of the apparatus of FIG. 2.

DETAILED DESCRIPTION OF THE DRAWINGS

Figure 1:
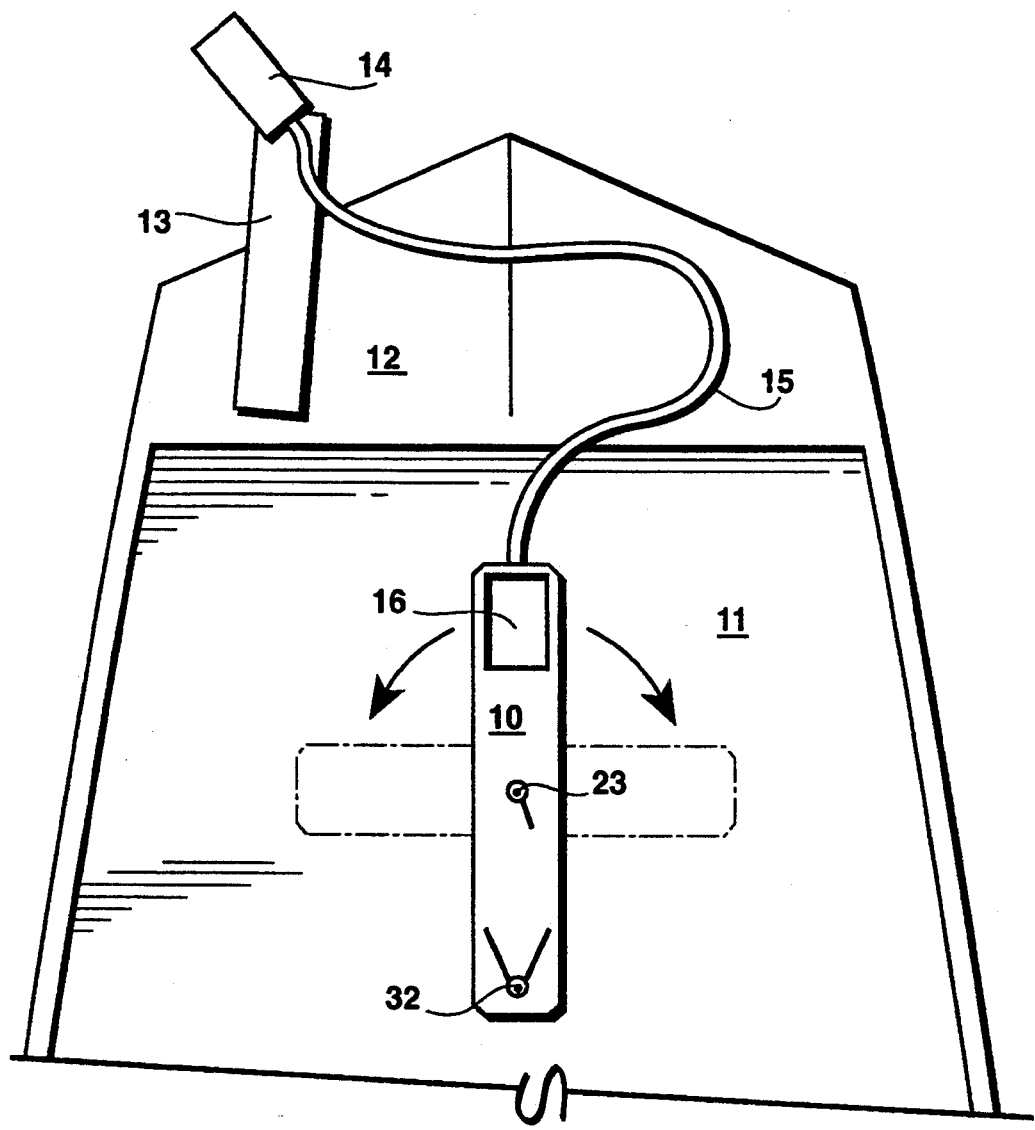
FIG. 1 is a top plan view of part of a fishing boat utilizing the teachings of the present invention, with the chair removed for clarity of illustration, and showing in dotted line an alternative position to which the support structure of the invention may be rotated.
Figure 4:
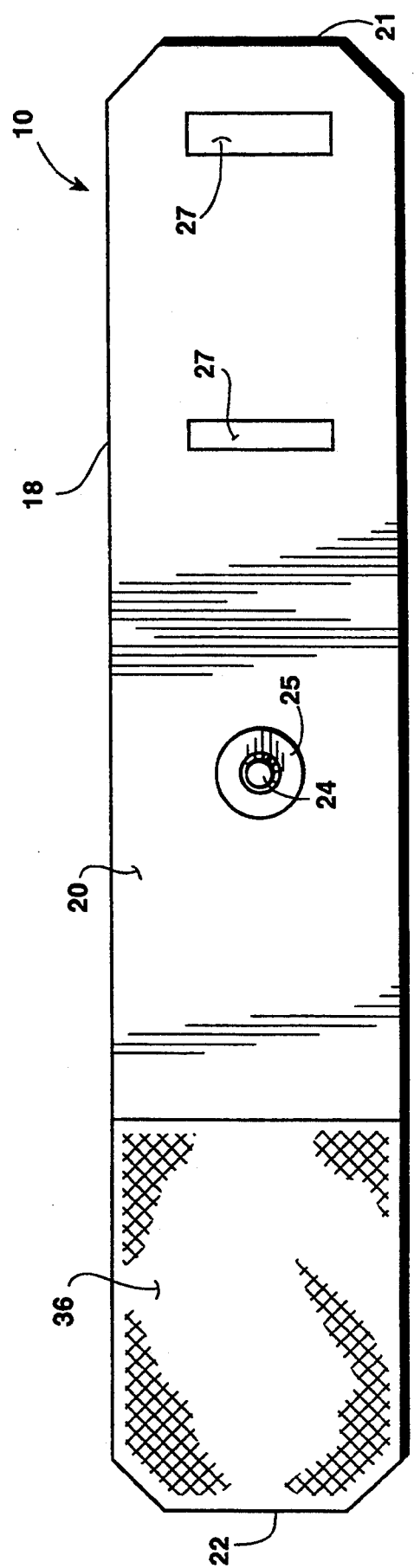

FIG. 1 shows exemplary apparatus according to the present invention—illustrated generally by reference numeral 10—mounted in association with a conventional type fishing boat which includes a boat deck 11, a bow deck 12, a trolling motor mount 13, a trolling motor control head 14, and a trolling motor control cable 15 leading to a trolling motor foot control pedal 16. The apparatus 10, per se, includes a support structure for the various components thereof. Preferably the support structure is in the form of a substantially planar plate 18 having a top surface 19 (see FIGS. 1-3 and 5), a bottom surface 20 (see FIGS. 2, 4 and 5), a first end 21, and a second end 22. The plate 18 may be of metal (such as steel about 0.25 inches thick), to which various components may be welded, or it may be molded integral with conneced components out of a relatively rigid plastic.

Extending downwardly from the bottom surface 19 of the plate 18 between the ends 21, 22 thereof (preferably roughly intermediate the ends) is a means for mounting the plate for rotation, i.e. for rotation about a first vertical axis 23 with respect to boat deck 11. The mounting means preferably comprises a shaft 24 (see FIGS. 2, 4 and 5) surrounded by a spacer washer 25 (having a given thickness, e.g. about 0.1-0.75 inces) at the portion thereof engaging the surface 20. If the plate 18 is of weldable material, the shaft 24 and washer 25 also are (e.g. steel), and are then preferably connected to the surface 20 by welding.

Figure 5:
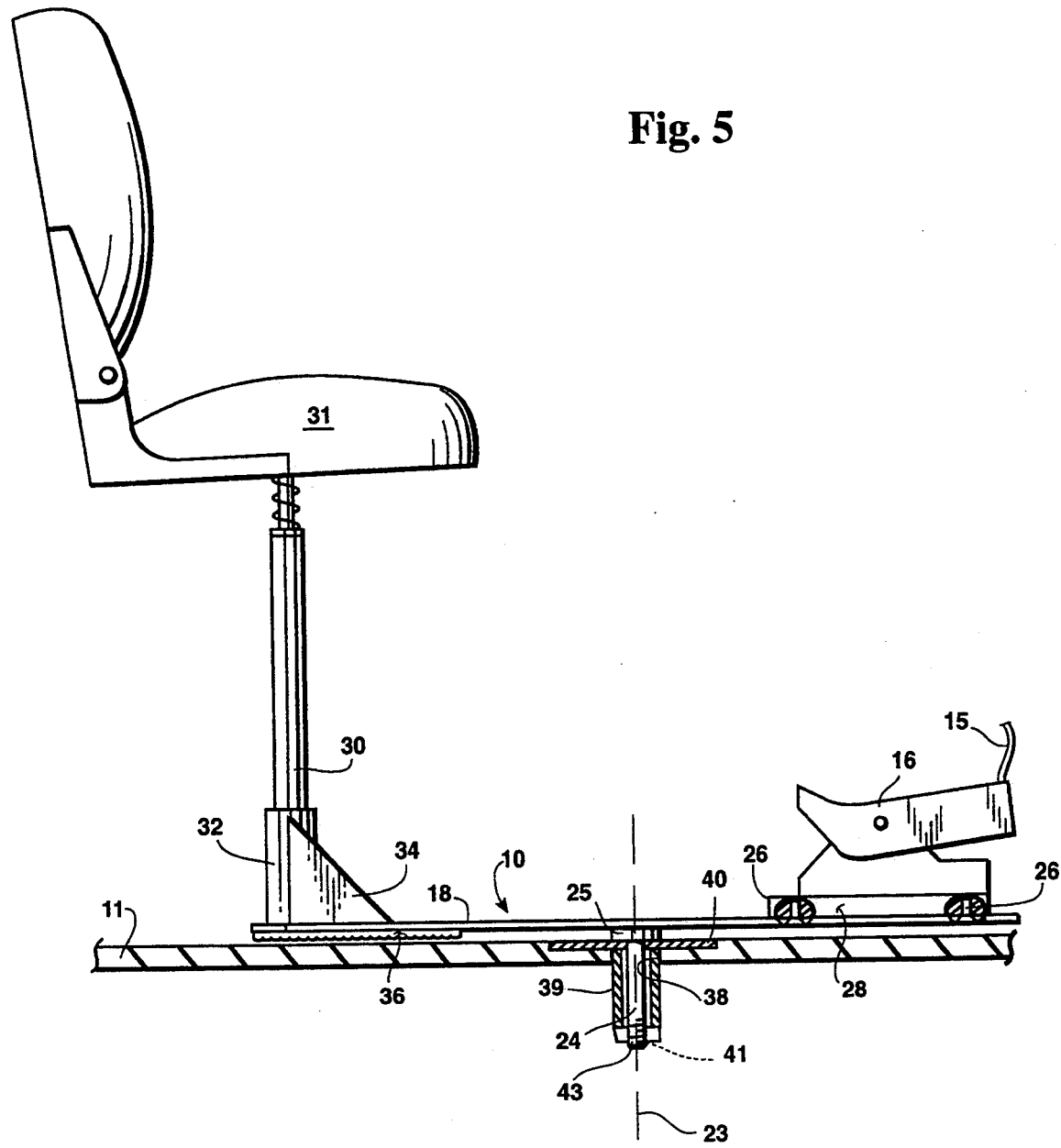
FIG. 5 is a side view, partly in cross-section, and partly in elevation, showing the apparatus of FIGS. 2-4 mounted on a fishing boat deck, and with a chair and trolling motor control pedal shown in association therewith.

Adjacent the first end 21 of the plate 18 are means for mounting the control pedal 16. Such means may take a wide variety of forms within the scope of he invention, and will in part depend upon the exact dimensions and nature of the pedal 16 to be mounted thereby. As seen most clearly in FIGS. 2, 3 and 5, however, the mounting means may take the form of surface manifestations which receive the control pedal. The surface manifestations illustrated in the drawings include flanges 26 which are formed by cutting them out of the body of the plate 18 and bending them upwardly above the top surface 19, the openings 27 remaining where they were bent out. Alternatively the flanges 26 may be separate pieces welded to the surface 19, or the surface manifestations may be simple openings (not shown) for receipt of fasteners which engage the bottom of the pedal 16. As seen in FIG. 5, a base portion 28 of the pedal 16 may be held between the flanges 26, to which it may be welded or attached by removable fasteners.

Provided adjcent the second end 22 of the plate 18 are means for mounting a seat structure, preferably means for mounting the conventional pedestal or post 30 of a conventional fisherman's chair 31 (see FIG. 5). The pedestal 30 mounting means preferably comprises a sleeve 32 (see FIGS. 1-3 and 5) which extends upwardly from surface 19 and defines a second substantially vertical axis 33 through the hollow center thereof, about which the pedestal 30 may rotate. The sleeve 32 typically is of metal (e.g. steel), and is welded to supporting gussets 34 and to the surface 19, the gussets 34 also being welded to surface 19.

It is desirable to provide the plate 18 with a movement-retarding means so that the structure will stay in the position to which it has been moved. This is preferably accomplished by using a non-skid material on the bottom surface 20 of the plate 18 beneath the sleeve 32, such as the conventional rubberized non-skid material 36 (see FIGS. 1, 2, 4 and 5) having a cross-hatch type pattern and adhesively secured to the surface 20 at and adjacent the second end 22 of plate 18.

The thickness and material of the plate 18, the thickness of the spacer washer 25, and the spacing of the sleeve 32 from the shaft 24, are such that when a human (fisherman) sits in the chair 31, as seen in FIG. 5, his or her weight causes the plate 18 second end 22 to deflect downwardly slightly, overcoming the inherent spacing normally provided by the washer 25, and causing the non-skid material 36 to engage the boat deck 11. This then resists movement of the entire support structure 10 about the axis 23; the plate 18 will easily rotate about the axis 23 only if intentionally rotated by the fisherman, typically (although dependent upon the weight of the fisherman and other criteria) by the fisherman moving upwardly in the seat slightly to relieve some of his or her weight being transmitted to the plate 18 and non-skid material 36, and pushing on deck 11 with his or her feet.

FIG. 5 shows a typical mounting arrangement for the apparatus 10 according to the invention with a boat deck 11. The shaft 24 passes through an opening 38 in the deck 11, including through a sleeve 39 which surrounds the shaft 24. At the top surface of the boat deck surrounding the opening 38 preferably a base plate 40 is provided (e.g. of a hard, low friction, wear-resistant material, such as smooth steel) which engages the bottom surface of the spacer washer 25. If it is desired to positively fasten the structure in place, a nut 41—shown in dotted line in FIG. 5—may be provided engaging the threaded bottom portion 43 of the shaft 24.

It will be seen that according to the invention, a simple and easy to construct and use apparatus has been provided facilitating control and comfort of a fisherman in a boat with a trolling motor. The plate 18, sleeve 32, gussets 34, flanges 26, shaft 24, washer 25, and non-skid material 36 are easy to obtain, fabricate, and assemble, and install in a bass boat once assembled. In using the apparatus 10, the fisherman sits in the seat 31, having ready access to the control pedal 16 which is positively mounted a predetermined distance from the chair 31 for easy access, and yet the fisherman can easily swivel about the axis 33 even if her or his full weight is supported by the chair 31 (the non-skid material 36 preventing undesired rotation of chair 31 about two axes simultaneously), and the fisherman may swivel about the axis 23 by slightly rising from the chair and pushing her or his feet along the boat deck 11.

While the invention has been herein shown and described in what is presently conceived to be the most practical and preferred embodiment, it will be apparent to those of ordinary skill in the art that many modifications thereof may be made within the scope fo the inventin, which scope is to be accorded the broadest interpretation of the appended claims so as to encompass all equialent structures and devices.

What is claimed is:

1. Apparatus facilitating control of a trolling motor, comprising:
    a support structure having a top surface and a bottom surface, and first and second ends spaced from each other;
    means for mounting said support structure for rotation about an axis, said mounting means extending outwardly from said bottom surface of said support structure between said first and second ends thereof;
    means for mounting a trolling motor control pedal adjacent said first end of said support structure on said top surface of said support structure;
    means for mounting a seat structure adjacent said second end of said support structure on said top surface of said support structure; and
    support structure movement-retarding means mounted on said bottom surface of said support structure adjacent said second end thereof, and below said seat structure mounting means to resist movement of said support structure to a position to which it has been moved if said movement-retarding means engages a boat deck surface beneath it.

2. Apparatus as recited in claim 1 wherein said support structure comprises a substantially planar plate.

3. Apparatus as recited in claim 2 wherein said movement-retarding means comprises non-skid material secured to said bottom surface of said support plate.

4. Apparatus as recited in claim 3 wherein said movement retarding means further comprises rubberized non-skid material adhesively secured to said bottom surface of said support plate at said second end thereof.

5. Apparatus as recited in claim 3 wherein said means for mounting a seat structure comprises sleeve connected to and upstanding from said top surface of said plate, said sleeve dimensioned to receive a pedestal or post of a chair therein.

6. Apparatus as recited in claim 5 wherein said means for mounting said support plate for rotation comprises a shaft fixed to said bottom surface of said plate at a point near or at the middle of said plate, between said first and second ends thereof, and extending downwardly therefrom, and adapted to be received in a boat deck.

7. Apparatus as recited in claim 6 wherein said means for mounting said support plate for rotation further comprises a spacing washer surrounding said shaft, and disposed in contact with said bottom surface of said plate.

8. Apparatus as recited in claim 7 wherein said plate, washer, and sleeve are of metal, and wherein said sleeve and washer are welded to said plate, and wherein said washer and plate have thicknesses of about 0.1–0.75 inches and 0.25 inches respectively.

9. Apparatus as recited in claim 6 wherein said means for mounting a trolling motor control pedal comprise surface manifestations formed in said plate adjacent said first end thereof for cooperating with a control pedal.

10. Apparatus as recited in claim 9 wherein said surface manifestations comprise at least one flange formed from said plate and upturned out of the plane of said substantially planar plate.

11. Apparatus as recited in claim 5 further comprising gussets mounted to said sleeve for securely supporting said sleeve on said plate.

12. Apparatus as recited in claim 3 wherein said plate is of a thickness and material, and is spaced from said rotation mounting means, and is spaced from a boat deck, and wherein said non-skid material is of such a thickness, such that said plate will deflect under the weight of a human sitting on a seat mounted by said seat support means so that said non-skid material will contact a boat deck beneath said non-skid material.

13. Apparatus as recited in clim 1 wherein said movment-retarding means comprises a non-skid material affixed to said bottom surface of said support structure.

14. Apparatus as recited in claim 1 wherein said means for mounting a seat structure comprises a sleeve connected to and upstanding from said top surface of said support structure, said sleeve dimensioned to receive a pedestal or post of a chair therein.

15. Apparatus as recited in claim 1 wherein said means for mounting said support structure for rotation comprises a shaft fixed to said bottom surface of said support structure at a point near or at the middle of said support structure, between said first and second ends thereof, and extending downwardly therefrom, and adapted to be received within a sleeve in a boat deck.

16. Apparatus comprising:
    a substantially planar plate having a top surface and a bottom surface, a first end, and a second end;
    a sleeve connected to said plate top surface adjacent said second end thereof and extending upwardly from said top surface;
    a shaft connected to said bottom surface of said plate roughly intermediate said first and second ends of said plate, and extending downwardly from said bottom surface; and
    a non-skid material connected to said plate bottom surface beneath said sleeve.

17. Apparatus as recited in claim 16 further comprising surface manifestations formed in said plate adjacent said first end thereof.

18. A fishing boat seat and trolling motor control pedal support structure mounted in a fishing boat having a boat deck, trolling motor control pedal, and a trolling motor, comprising:
    a support structure having a top surface and a bottom surface, and first and second ends spaced from each other;
    means for mounting said support structure to said boat deck for rotation about a first substantially vertical axis, said mounting means extending outwardly from said bottom surface of said support structure between said first and second ends thereof into or through said boat deck;
    means for mounting said trolling motor control pedal adjacent said first end of said support structure on said top surface of said support structure;
    a seat structure including a pedestal or post;
    means for mounting said seat structure pedestal or post adjacent said second end of said support structure on said top surface of said support structure extending so that said seat structure is mounted above said boat deck, and so that said seat structure is rotatable about a second substantially vertical axis, spaced from said first axis, with respect to said support structure; and support structure movement-retarding means mounted on said bottom surface of said support structure adjacent said second end thereof, and below said seat structure mounting means to resist movement of said support structure to a position to which it has been moved if said movement-retarding means engages said boat deck beneath it.

19. Apparatus as recited in claim 18 wherein said support structure comprises a substantially planar plate.

20. Apparatus as recited in claim 19 wherein said movement-retarding means comprises rubberized non-skid material secured to said bottom surface of said support plate just above said boat deck, so that the weight of a human sitting on said seat structure causes said non-skid material to contact said boat deck and resist movement of said plate with respect to said boat deck.

* * * * *